United States Patent
Eaton et al.

(10) Patent No.: US 7,534,403 B2
(45) Date of Patent: May 19, 2009

(54) BULK POLYMERIZATION REACTORS

(76) Inventors: Gerald B. Eaton, 16222 DeLozier, Houston, TX (US) 77040; Patrick Trainor, Cuckoo Cottage, Stroud Lane, Blackwater, Camberley, Surrey (GB) GU17 0AW (*) Notice: Subject to any disclaimer, the term of this patent is extended or adjusted under 35 U.S.C. 154(b) by 539 days.

(21) Appl. No.: 11/406,110

(22) Filed: Apr. 18, 2006

(65) Prior Publication Data
US 2006/0182666 A1    Aug. 17, 2006

Related U.S. Application Data

(62) Division of application No. 10/170,785, filed on Jun. 12, 2002.

(60) Provisional application No. 60/297,931, filed on Jun. 13, 2001.

(51) Int. Cl.
*B01L 3/00* (2006.01)
*B01J 19/00* (2006.01)

(52) U.S. Cl. .................. 422/198; 422/102

(58) Field of Classification Search .......... 422/198, 422/102
See application file for complete search history.

(56) References Cited

U.S. PATENT DOCUMENTS 6,320,000 B1 *  11/2001  Hurry et al. ............. 526/67

FOREIGN PATENT DOCUMENTS

GB          2054819 A  *  2/1981

* cited by examiner

*Primary Examiner*—William K Cheung
(74) *Attorney, Agent, or Firm*—Alton W. Payne

(57) ABSTRACT

A polymerization reactor having at least three side wall surfaces and a bottom wall surface forming a reservoir and at least one heat exchanger plate in fluid communication with a coolant source, wherein each of the at least one heat exchanger plate is disposed on a lid. The polymerization reactors of the present invention permit large amounts of polymer to be formed in each reactor batch. Preferably, polymers are formed in the polymerization reactor by bulk polymerization. Methods for forming polymers is also disclosed.

19 Claims, 3 Drawing Sheets

BULK POLYMERIZATION REACTORS

RELATED APPLICATION

This application is a divisional application of, and claims the benefit of, U.S. application Ser. No. 10/170,785, filed Jun. 12, 2002, and which is currently pending.

This application claims the benefit of U.S. Provisional Patent Application Ser. No. 60/297,931, filed Jun. 13, 2001.

BACKGROUND OF THE INVENTION

1. Field of the Invention

This invention relates to reactors for conducting polymerization of monomers, and in particular, bulk polymerization reactors for conducting polymerization of alpha-olefin monomers.

2. Description of Related Art

Formation of polymers from various monomers is a well-known art. As is also well known in the art, the polymerization reactor in which the polymers are formed from the monomers have certain inherent limitations to efficiently form the polymers. A major inherent limitation is the removal of heat from the polymerization reactor created by the chemical reaction between the monomers and the catalyst during formation of the polymers. To overcome this problem, cooling systems have been designed to encase the polymerization reactor in an attempt to remove the heat from the polymerization reactor. Additionally, cooling additives may be included in the polymerization reaction mixture in the polymerization reactor.

Both of these prior attempts, however, have various shortcomings. For example, the use of cooling systems outside the polymerization reactor do not efficiently and effectively remove heat from the polymerization reactor, especially for the center most region of the polymerization reactor. Accordingly, the size of the polymerization reactor must be small and limited amounts of polymer may be formed in each reactor batch. Additionally, with respect to the addition of cooling additives to the polymerization reactants, these cooling additives can have an adverse effect on the quality of the polymer as well as increasing the cost associated with forming the polymer.

In other prior attempts, as discussed in U.S. Pat. Nos. 5,449,732, 5,504,131, and 5,504,132, the polymerization reactor is a crystalline, hydrocarbon-insoluble organic polymer reaction enclosure capable of substantially preventing passage of oxygen and water, i.e., plastic bags. Use of these plastic bags permits the polymerization reaction to be carried out without a cooling system or addition of cooling additives. However, because the plastic bags are not provided with any assistance in the removal of heat from the polymerization reaction, only small amounts of polymer reactants, e.g., monomer and catalyst, can be included in each plastic bag. As such, only small amounts of polymer can be formed in each of this type of polymerization reactor. Further, the plastic bags can not be easily separated from the polymer, and thus, are not re-useable.

Accordingly, prior to the development of the present invention, there has been no polymerization reactor or process for forming polymers, which: effectively remove heat away from the polymerization reactor; permit the formation of a large amount of polymer in each polymerization reactor; do not require the addition of cooling additives; and permit the use of a re-useable polymerization reactor. Therefore, the art has sought a polymerization reactor and a process for forming polymers, which: effectively remove heat away from the polymerization reactor; permit the formation of a large amount of polymer in each polymerization reactor; do not require the addition of cooling additives; and permit the use of a re-useable polymerization reactor.

SUMMARY OF INVENTION

In accordance with the invention, the foregoing advantages have been achieved through the present polymerization reactor for polymerization of olefins comprising: a reservoir having at least three side wall surfaces and a bottom wall surface thereby forming a reservoir cavity; at least one heat exchanger plate in fluid communication with a coolant source; and a lid having a top wall surface and an inner wall surface, wherein the at least one heat exchanger plate is disposed along inner wall surface.

A further feature of the polymerization reactor is that the polymerization reactor may comprise four side wall surfaces. Another feature of the polymerization reactor is that each of the four side wall surfaces may have a square shape having a length and a height. An additional feature of the polymerization reactor is that two of the four side wall surfaces may have a length of at least two feet and a height of at least two feet and the other two of the four side wall surfaces may have a length of at least three feet and a height of at least two feet. Still another feature of the polymerization reactor is that the lid may be rectangularly shaped having a length and a width, the length being at least three feet and the width being at least two feet. A further feature of the polymerization reactor is that the lid may include at least two heat exchanger plates. Another feature of the polymerization reactor is that each of the at least two heat exchanger plates may be disposed at a distance of at least three inches from each other. An additional feature of the polymerization reactor is that the polymerization reactor may further comprise at least one coolant inlet manifold in fluid communication with the coolant source and at least one coolant outlet manifold in fluid communication with the coolant source. Still another feature of the polymerization reactor is that the polymerization reactor may further comprise at least one coolant inlet conduit in fluid communication with the at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates. A further feature of the polymerization reactor is that the lid may include a plate hanger assembly disposed along the inner wall surface for attaching each of the at least one heat exchanger plates to the inner wall surface of the lid. Another feature of the polymerization reactor is that each of the at least one heat exchanger plates may be in fluid communication with a coolant inlet conduit and a coolant outlet conduit. An additional feature of the polymerization reactor is that each of the coolant inlet conduits may be in fluid communication with a coolant inlet manifold and each of the coolant outlet conduits may be in fluid communication with a coolant outlet manifold. Still another feature of the polymerization reactor is that the coolant inlet manifold and the coolant outlet manifold may be in fluid communication with the coolant source. A further feature of the polymerization reactor is that the reservoir may include four walls having a length, the length being at least 4 feet, and a width, the width being at least 2 feet. Another feature of the polymerization reactor is that the inner wall surface of the lid may include at least 6 heat exchanger plates. An additional feature of the polymerization reactor is that each of the at least one heat exchanger plate may include a removable film.

In accordance with the invention, the foregoing advantages have also been achieved through the present polymerization reactor for polymerization of olefins comprising: a reservoir having at least three side wall surfaces and a bottom wall surface thereby forming a reservoir cavity; a heat exchanger, the heat exchanger having a heat exchanger assembly, coolant inlet manifold in fluid communication with a coolant source, at least one coolant inlet conduit in fluid communication with at least one heat exchanger plate, at least one coolant outlet conduit in fluid communication with each of the at least one heat exchanger plate and in fluid communication with a coolant outlet manifold, the coolant outlet manifold in fluid communication with the coolant source; and a lid having a top wall surface and an inner wall surface, wherein the at least one heat exchanger plate is disposed along inner wall surface.

A further feature of the polymerization reactor is that the polymerization reactor comprises four side wall surfaces, two of the four side wall surfaces having a length of at least two feet and a height of at least two feet, the other two of the four side wall surfaces having a length of at least three feet and a height of at least two feet, and the lid is rectangularly shaped having a length and a width, the length being at least three feet and the width being at least two feet.

In accordance with the invention, the foregoing advantages have also been achieved through the present method of polymerization comprising the steps of: combining at least one monomer and at least one catalyst in a reservoir to form a polymerization reaction mixture, the reservoir having at least three side walls and a bottom wall thereby forming a reservoir cavity; inserting at least one heat exchanger plate having an exchanger cavity in fluid communication with a coolant source into the reservoir cavity thereby contacting the polymerization reaction mixture; and removing the at least one heat exchanger plate from the reaction mixture after sufficient time has passed to permit a majority of the at least one monomer to form a polymer.

A further feature of the method of polymerization is that the method may further comprise the step of disposing a removable film on each of the at least one heat exchanger plate prior to inserting the at least one heat exchanger plate into the reservoir cavity.

The polymerization reactor and process for forming polymers have the advantages of: effectively removing heat away from the polymerization reactor; permitting the formation of a large amount of polymer in each polymerization reactor; not requiring the addition of cooling additives; and permitting the use of a re-useable polymerization reactor.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

Broadly, the polymerization reactor of the present invention includes a reservoir and a lid having a heat exchanger. When the lid is placed on the reservoir, the head exchanger is disposed within the reservoir thereby cooling, i.e., removing heat from, the contents of the reservoir.

Figure 1:
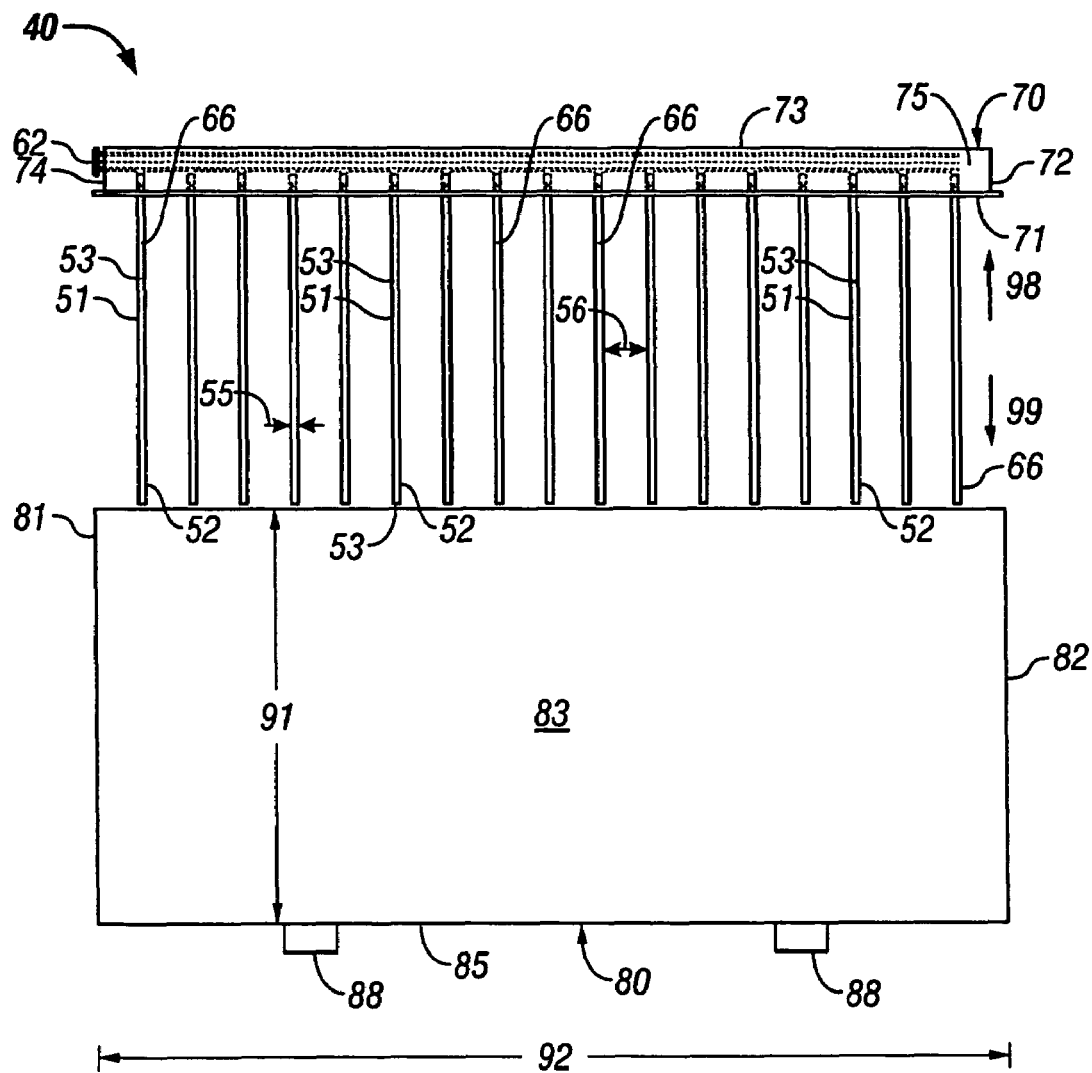
FIG. 1 is a side view of one specific embodiment of the polymerization reactor of the present invention.
Figure 2:
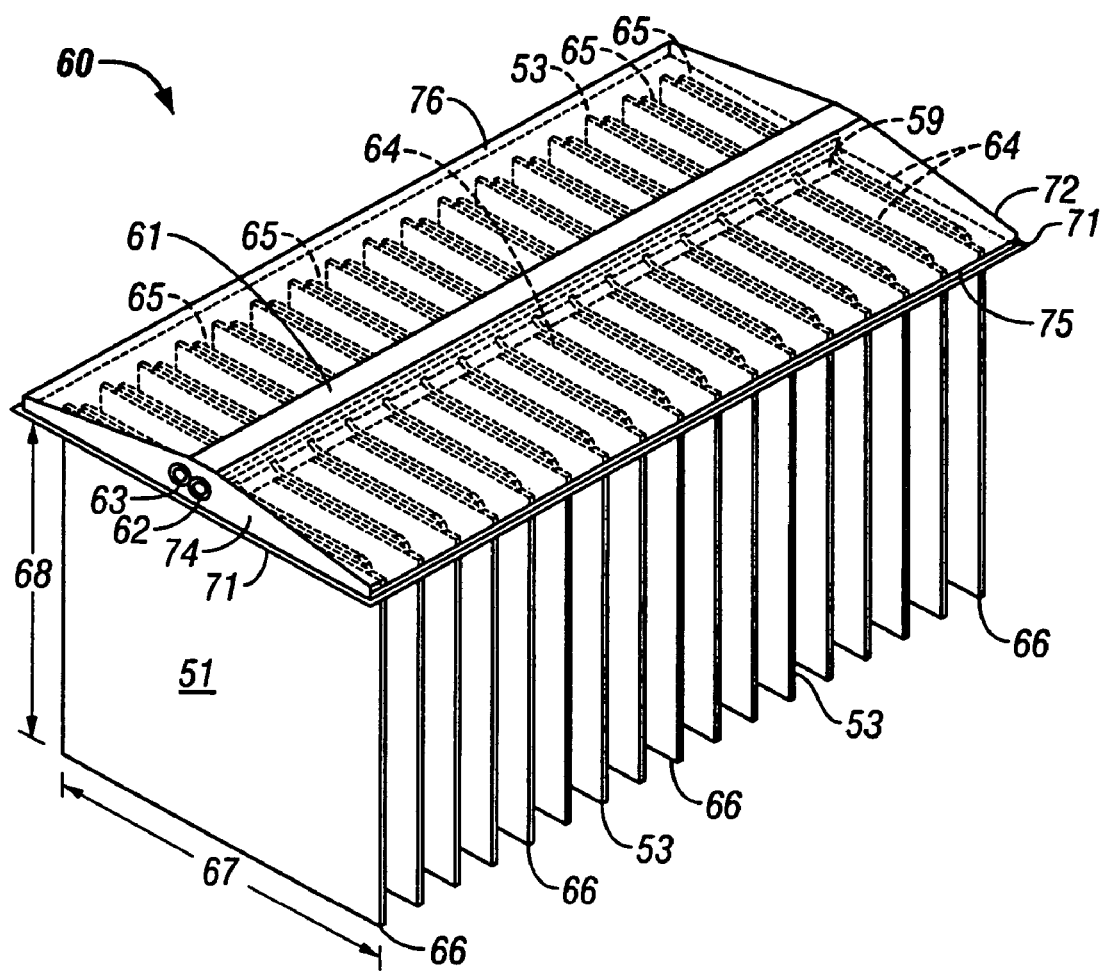
FIG. 2 is a perspective view of the heat exchanger of the polymerization reactor shown in FIG. 1.
Figure 3:
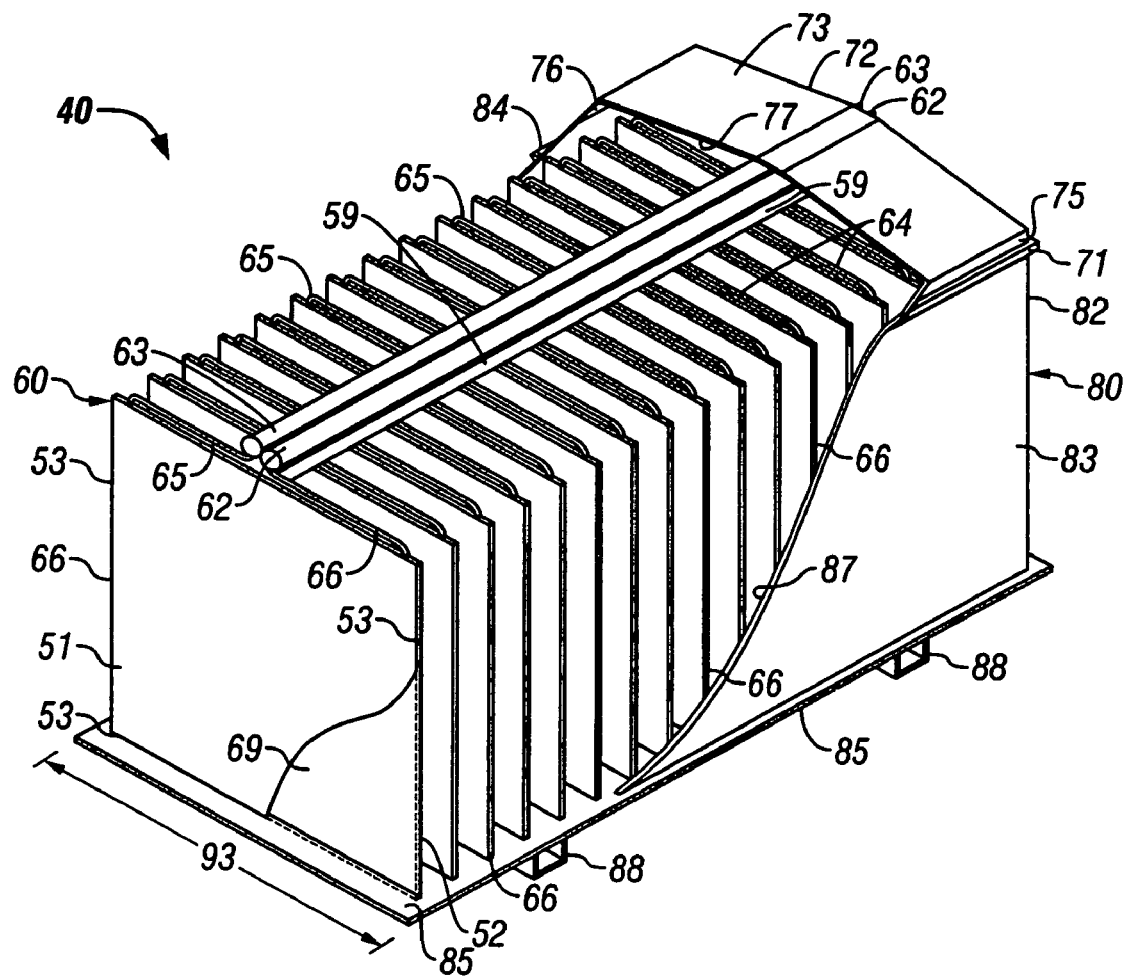
FIG. 3 is a perspective view of the polymerization reactor shown in FIG. 1.

Referring now to FIGS. 1-3, in one specific embodiment of the present invention, polymerization reactor 40 includes reservoir 80 and lid 70. Lid 70 includes heat exchanger 60. Reservoir 80 includes at least three wall surfaces and a bottom wall surface to form a cavity. As shown in FIGS. 1-3, reservoir preferably includes four side wall surfaces, 81, 82, 83, 84, and bottom wall surface 85 to form reservoir cavity 87. While it is to be understood that additional wall surfaces may be included as part of reservoir 80, thereby permitting reservoir 80 to have any desired shape, preferably reservoir 80 includes four wall surfaces thereby having a rectangular shape (FIGS. 1-3), or cube shaped.

Reservoir 80 preferably includes at least one skid 88. As shown in FIGS. 1 and 3, reservoir 80 includes two skids 88. Skids 88 permit a forklift, or other lifting device, to engage reservoir 80 so that it can be moved to any desired location, i.e., to be placed near sources of monomer that are to be charged, or transported, into reservoir 80.

As shown in FIGS. 1 and 3, reservoir 80 includes length 92, height 91, and width 93. Length 92, height 91, and width 93 may be any distance as desired by the person using polymerization reactor 40. It is to be understood, however, that generally, as length 92 increases, the number of heat exchanger plates 66 also increases, and as height 91 and width 93 increase, the dimensions of heat exchanger plate 66 increases. In one specific embodiment, length 92, height 91, and width 93 are equal and each are at least 2 feet. In this embodiment, polymerization reactor 40 is cubed shaped. In a preferred embodiment, length 92 is at least 3 feet, height 91 is at least 2 feet, and width 93 is at least 2 feet. In this preferred embodiment, polymerization reactor 40 is rectangularly shaped.

Reservoir 80 may be formed out of any material known to persons of ordinary skill in the art. Preferably, reservoir 80 is formed out of stainless steel.

Referring now to FIGS. 1-3, lid 70 includes top wall surface 73 and side wall surfaces 72, 74, 75, 76. Lip 71 may be included to provide additional strength. Lid 70 provides protection to heat exchanger 60 from the environment and prevents items from falling onto heat exchanger 60 and into reservoir 80. Lid 70 also includes an inner surface 77 to which heat exchanger 60 is attached. Lid 70 may be formed out of any material known to persons of ordinary skill in the art. Preferably, lid 70 is formed out of stainless steel.

Heat exchanger 60 preferably includes plate hanger assembly 61, coolant inlet manifold 62, coolant outlet manifold 63, at least one coolant inlet conduit 64, at least one coolant outlet conduit 65, and at least one heat exchanger plate 66 having exchanger cavity 69. Hanger assembly 61 preferably includes bracket 59 to permit attachment of each heat exchanger 66 to lid 70.

Coolant inlet manifold 62 is in fluid communication with at least one coolant inlet conduit 64 which is in fluid communication with heat exchanger plate 66. Likewise, coolant outlet manifold 63 is in fluid communication with at least one coolant outlet conduit 65 which is in fluid communication with heat exchanger plate 66. In one specific embodiment, having one heat exchanger plate 66, one of each of coolant inlet conduit 64 and coolant outlet conduit 65 is in fluid communication with coolant input manifold 62 and coolant outlet manifold 63, respectively. In other embodiments having more than one heat changer plate 66, as shown in FIGS. 1-3, each heat exchanger plate 66 includes at least one coolant inlet conduit 64 and one coolant outlet conduit 65 in fluid communication with coolant inlet manifold 62 and coolant outlet manifold 63, respectively. Therefore, coolant is permitted to pass from coolant source, through coolant inlet manifold 62, through each of the at least one coolant inlet conduits 64 into exchanger plate cavity 69 of each of the at least one heat exchanger plates 66, from the exchanger plate cavity 69 through coolant outlet conduit 65, through coolant outlet manifold 63 and back to coolant source. In so doing, heat is removed from the polymerization reaction mixture, i.e., the polymerization reaction mixture is cooled.

As discussed above, coolant inlet manifold 62 and coolant output manifold 63 are in fluid communication with coolant source. Acceptable coolant sources include, but are not limited to, refrigeration units readily known to persons of ordinary skill in the art employing water, water-glycol mixtures, water-alcohol mixtures, dissolved mineral salts, e.g., sodium chloride and calcium chloride, and ammonium as coolants. In this arrangement, coolant may be circulated from the coolant source, through a conduit, e.g., pipe or flexible hose (not shown), into coolant inlet manifold 61. Coolant is then permitted to enter coolant inlet conduit 64 and into exchanger cavity 69 of each heat exchanger plate 66.

Coolant then is permitted to exit each exchanger cavity 69 of each heat exchanger plate 66 through coolant outlet conduit 65 and into coolant outlet manifold 63. Coolant is then transported back to coolant source from coolant outlet manifold 65 through a conduit, e.g., pipe or flexible hose (not shown) to be recharged, i.e., cooled, and circulated back through heat exchanger 60.

Referring now to FIGS. 1-2, each heat exchanger plate 66 is formed from front wall surface 51, back wall surface 52, and at least one side wall surface 53 to form cavity 69. Heat exchanger plate 66 also includes length 67, width 68, and thickness 55. Heat exchanger plate 66 may be any shape and formed out of any material desired or necessary to provide sufficient area to cool the polymerization reaction mixture in reservoir 80. Preferably, heat exchanger plate 66 is formed from aluminum. As shown in FIGS. 1-3, each heat exchanger plate 66 includes four side wall surfaces 53 although it is to be understood that heat exchanger plate 66 may be circularly shaped. In embodiments having more than one heat exchanger plate 66, each heat exchanger plate is disposed at a distance 56 from the next heat exchanger plate 66.

In a preferred embodiment, each heat exchanger plate 66 includes a removable film, e.g., plastic sheath, to prevent polymer formed in reservoir 80 during polymerization from adhering to each heat exchanger plate 66. Suitable removable films include plastic sheeting, plastic sheath, a spray-on non-stick substance that is incapable of being polymerized by the polymerization reaction mixture, for example, because the spray-on non-stick substance has a melting point higher than the temperature of the polymerization reaction mixture.

The number of heat exchanger plates 66 present in each embodiment of polymerization reactor 40 is determined by the size of reservoir 80. In the specific embodiment illustrated in FIGS. 1-3, reservoir 80 includes length 92 of 8 feet, 3 inches, height 91 of 4 feet, 1 inch, and width 93 of 4 feet, 3 inches, and each heat exchange plate 66 includes length 67 of 4 feet, width 68 of 4 feet, and thickness 55 of approximately ⅞ inch. Seventeen heat exchanger plates 66 are disposed along plate hanger assembly 61 with distance 56 between each heat exchanger plate of approximately 4 13/16 inches. It is to be understood that all of the foregoing dimensions may be altered as desired or necessary to provide sufficient cooling of the polymerization reaction mixture and to optimize polymer functionality.

The polymerization reactors 40 of the present invention may be used to polymerize monomers into polymers, and in particular, alpha olefin monomers into polyalphaolefins. As mentioned above, numerous polymerization methods, reactants, i.e., monomers, catalysts, co-catalysts, are known to persons of ordinary skill in the art. Additionally, bulk polymerization methods are known to persons of ordinary skill in the art. However, none of these known polymerization methods have been conducted in the polymerization reactors 80 discussed above.

In one specific embodiment of the present method for polymerization, at least one monomer and at least one catalyst are combined to form a polymerization reaction mixture in reservoir 80. Lid 80 having at least one heat exchanger plate 66 is then disposed on top of reservoir 80 to protect the polymerization reaction mixture from the environment. During placement of lid 70, each of the at least one heat exchanger plates 66 are inserted into reservoir 80, and thus, the polymerization reaction mixture. Preferably, lid 70 is lowered in the direction of arrow 99 during insertion of each of the at least one heat exchanger plates 66 into the polymerization reaction mixture. Coolant is then permitted to passing from the coolant source and into, and then out of, each exchanger cavity 69 of each of the at least one heat exchanger plates 66. During circulation of coolant through each heat exchanger plate 66, the polymerization reaction mixture is cooled. Each heat exchanger plate 66 is permitted to contact the polymerization reaction mixture for a length of time necessary for a majority of the monomers to be polymerized into polymer. Lid 70 may then be moved in the direction of arrow 98 for removal of each of the at least one heat exchanger plates 66 from the polymerization reaction mixture.

It is to be understood that the invention is not limited to the exact details of construction, operation, exact materials, or embodiments shown and described, as obvious modifications and equivalents will be apparent to one skilled in the art. For example, each of the heat exchanger plates may include more than one coolant inlet conduit or more than one coolant outlet conduit. The dimensions and shapes of the polymerization reactors can be easily determined by a person of ordinary skill in the art. Moreover, additional diagnostic gauges may be included as part of the polymerization reactor, e.g., for monitoring temperature during the polymerization reaction. Additionally, the shape of the heat exchanger plates may be any shaped desired or necessary due to the shape of the reservoir, e.g., circularly-shaped, rectangularly-shaped, triangularly-shaped, trapezoidally-shaped, etc. Accordingly, the invention is therefore to be limited only by the scope of the appended claims.

What is claimed is:

1. A bulk polymerization reactor for bulk polymerization of olefins comprising:
   a tank reactor having at least three side wall surfaces and a bottom wall surface thereby forming a reservoir cavity;
   at least one heat exchanger plate in fluid communication with a coolant source; and
   a lid having a top wall surface and an inner wall surface, wherein the at least one heat exchanger plate is disposed along the inner wall surface such that the at least one heat exchanger plate is disposable within the reservoir cavity, thereby providing a unitary bulk polymerization reactor in which a bulk polyolefin is formed in situ within the reservoir cavity and around the at least one heat exchanger plate within the reservoir cavity.

2. The bulk polymerization reactor of claim 1, wherein the bulk polymerization reactor comprises four side wall surfaces.

3. The bulk polymerization reactor of claim 2, wherein each of the four side wall surfaces has a square shape having a length and a height.

4. The bulk polymerization reactor of claim 2, wherein two of the four side wall surfaces include a length of at least two feet and a height of at least two feet; and
the other two of the four side wall surfaces include a length of at least three feet and a height of at least two feet.

5. The bulk polymerization reactor of claim 4, wherein the lid is rectangularly shaped having a length and a width, the length being at least three feet and the width being at least two feet.

6. The bulk polymerization reactor of claim 1, wherein the lid includes at least two heat exchanger plates.

7. The bulk polymerization reactor of claim 6, wherein each of the at least two heat exchanger plates are disposed at a distance of at least three inches from each other.

8. The bulk polymerization reactor of claim 1, further comprising at least one coolant inlet manifold in fluid communication with the coolant source and at least one coolant outlet manifold in fluid communication with the coolant source.

9. The bulk polymerization reactor of claim 8, further comprising at least one coolant inlet conduit in fluid communication with the at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates.

10. The bulk polymerization reactor of claim 1, wherein the lid includes a plate hanger assembly disposed along the inner wall surface for attaching each of the at least one heat exchanger plates to the, inner wall surface of the lid.

11. The bulk polymerization reactor of claim 1, wherein each of the at least one heat exchanger plates is in fluid communication with a coolant inlet conduit and a coolant outlet conduit.

12. The bulk polymerization reactor of claim 11, wherein each of the coolant inlet conduits is in fluid communication with a coolant inlet manifold and each of the coolant outlet conduits is in fluid communication with a coolant outlet manifold.

13. The bulk polymerization reactor of claim 12, wherein the coolant inlet manifold and the coolant outlet manifold are in fluid communication with the coolant source.

14. The bulk polymerization reactor of claim 1, wherein the tank reactor includes four walls having a length, the length being at least 4 feet, and a width, the width being at least 2 feet.

15. The bulk polymerization reactor of claim 1, wherein the inner wall surface of the lid includes at least 6 heat exchanger plates.

16. The bulk polymerization reactor of claim 1, wherein the at least one heat exchanger plate is disposed along the inner wall surface such that a bulk polymerization reaction mixture is permitted to substantially surround at least one of the at least one heat exchanger plates to facilitate formation of a bulk polyolefin.

17. The bulk polymerization reactor of claim 1, wherein the at least one heat exchanger plate is disposed along the inner wall surface such that a bulk polymerization reaction mixture is permitted to substantially surround each of the at least one heat exchanger plate to facilitate formation of a bulk polyolefin.

18. A bulk polymerization reactor for bulk polymerization of olefins comprising:
a tank reactor having at least three side wall surfaces and a bottom wall surface thereby forming a reservoir cavity;
a heat exchanger, the heat exchanger having a heat exchanger assembly, coolant inlet manifold in fluid communication with a coolant source, at least one coolant inlet conduit in fluid communication with at least one heat exchanger plate, at least one coolant outlet conduit in fluid communication with at least one of the at least one heat exchanger plates and in fluid communication with a coolant outlet manifold, the coolant outlet manifold in fluid communication with the coolant source; and
a lid having a top wall surface and an inner wall surface, wherein at least one of the at least one heat exchanger plates is disposed along the inner wall surface such that the at least one heat exchanger plate is disposable within the reservoir cavity, thereby providing a unitary bulk polymerization reactor in which a bulk polyolefin is formed in situ within the reservoir cavity and around the at least one heat exchanger plate within the reservoir cavity.

19. The bulk polymerization reactor of claim 18, wherein
the tank reactor comprises four side wall surfaces,
two of the four side wall surfaces having a length of at least two feet and a height of at least two feet,
the other two of the four side wall surfaces having a length of at least three feet and a height of at least two feet, and
the lid is rectangularly shaped having a length and a width, the length being at least three feet and the width being at least two feet.

* * * * *